US010091557B2

(12) United States Patent
Rao

(10) Patent No.: US 10,091,557 B2
(45) Date of Patent: Oct. 2, 2018

(54) IDENTIFYING AND SHARING VIDEO CONTENT ON A DIGITAL NETWORK

(71) Applicant: SLING MEDIA INC., Foster City, CA (US)

(72) Inventor: Padmanabha R. Rao, Palo Alto, CA (US)

(73) Assignee: SLING MEDIA L.L.C., Foster City, CA (US)

(*) Notice: Subject to any disclaimer, the term of this patent is extended or adjusted under 35 U.S.C. 154(b) by 0 days.

(21) Appl. No.: 14/984,431

(22) Filed: Dec. 30, 2015

(65) Prior Publication Data

US 2016/0192012 A1 Jun. 30, 2016

Related U.S. Application Data

(60) Provisional application No. 62/098,114, filed on Dec. 30, 2014.

(51) Int. Cl.
H04N 7/173 (2011.01)
H04N 21/4788 (2011.01)
H04N 21/84 (2011.01)
H04N 21/61 (2011.01)
H04N 21/482 (2011.01)
H04N 21/472 (2011.01)
H04N 21/658 (2011.01)
H04N 21/8352 (2011.01)

(52) U.S. Cl.
CPC ... *H04N 21/4788* (2013.01); *H04N 21/47214* (2013.01); *H04N 21/4828* (2013.01); *H04N 21/6125* (2013.01); *H04N 21/6581* (2013.01); *H04N 21/8352* (2013.01); *H04N 21/84* (2013.01)

(58) Field of Classification Search
CPC .......... H04N 21/4788; H04N 21/4828; H04N 21/6581; H04N 21/8352; H04N 21/84; G06F 17/30843
See application file for complete search history.

(56) References Cited

U.S. PATENT DOCUMENTS 7,895,625 B1* 2/2011 Bryan .................... H04N 5/782
725/46
2004/0034650 A1* 2/2004 Springer, Jr. ..... G06F 17/30038
2011/0150432 A1 6/2011 Paul et al.
(Continued)

OTHER PUBLICATIONS

Internet Engineering Task Force (IETF), Request for Comments: 6838, Media Type Specifications and Registration Procedures, Jan. 2013.

*Primary Examiner* — James R Marandi
(74) *Attorney, Agent, or Firm* — Lorenz & Kopf LLP

(57) ABSTRACT

Systems, processes and devices identify content on the Internet or another network. A media player device receives an identifier that is uniquely associated with a particular media program. The identifier is submitted from the media player device to a registry service accessible via the digital network to thereby locate the particular media program for playback by the media player device or for performing other actions, and a message containing the identifier is initiated and transmitted to a recipient media player device via the digital network to thereby allow the recipient media player device to locate the same particular media program on the digital network using the identifier.

7 Claims, 2 Drawing Sheets

(56) References Cited

U.S. PATENT DOCUMENTS

Figure 1:
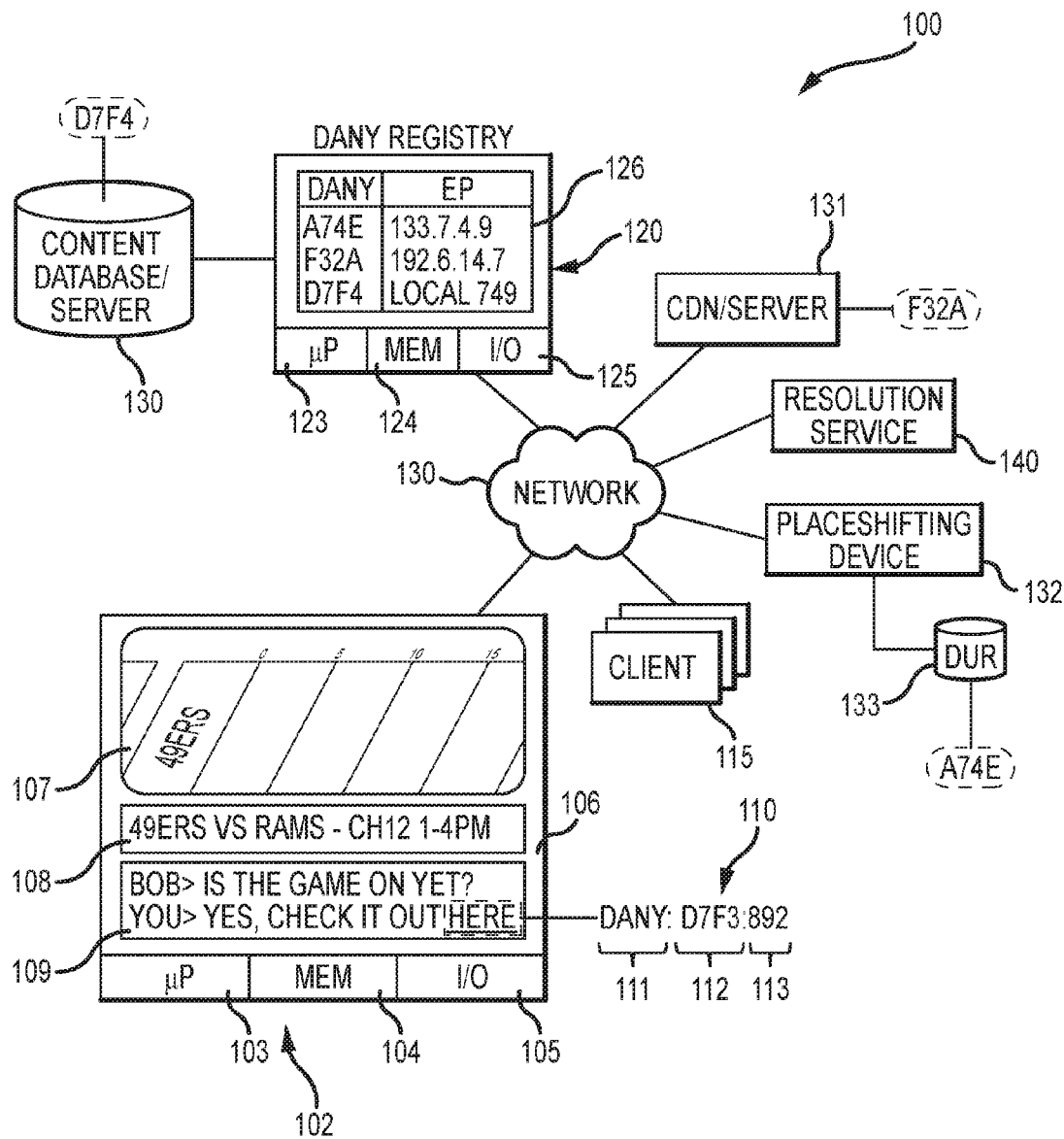

2013/0133000 A1\* 5/2013 Kelley ................ H04N 21/482
                                                    725/37
2014/0165116 A1   6/2014 Major et al.

\* cited by examiner

IDENTIFYING AND SHARING VIDEO CONTENT ON A DIGITAL NETWORK

PRIORITY CLAIM

This application claims priority to U.S. Provisional Application Ser. No. 62/098,114 filed on Dec. 30, 2014, which is incorporated herein by reference.

TECHNICAL FIELD

The following discussion generally relates to locating and referencing video content on a digital network. More particularly, the following discussion relates to systems, devices and processes used to identify reference and/or share video content using the Internet or another digital network.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, local storage and/or remote storage digital video recorder (LSDVR and/or RSDVR) services, Internet Protocol television (IPTV) services, placeshifted media viewing and/or any number of other convenient services.

Various server systems and processes have been developed to store and retrieve encoded video data from DVRs, video servers and/or the like. US Patent Publication 2014/0165116, for example, is incorporated herein by reference to show examples of systems and associated processes that can be used with RSDVR, IPTV and/or VOD systems. US Patent Publication 2011/0150432 is also incorporated by reference to show examples of systems and processes used in managing placeshifting applications in which client devices access files stored on remotely-located DVRs, such as DVRs located within the customers' homes. Other systems and processes could be used with any number of different applications, as desired.

With the wealth of content that is now available via video streaming, it can be a substantial challenge to properly identify and reference particular television shows, movies, video clips and/or other content items. The inability to properly identify programs limits the user's ability to share content via messaging, social media, or the like.

It is therefore desirable to create systems, devices and processes that allow proper identification and referencing of video content available to a placeshifting, LSDVR, RSDVR, VOD or similar client. These and other desirable features and characteristics will become apparent from the subsequent detailed description and the appended claims, taken in conjunction with the accompanying drawings and this background section.

BRIEF DESCRIPTION

The following discussion relates to various example implementations of systems, devices and processes that can efficiently identify and reference video content that is available to a media player application. The general concepts may be implemented in placeshifting, RSDVR, LSDVR, VOD, IPTV, over-the-top (OTT) video streaming, and/or any number of other applications.

Various examples provide systems, methods and devices to identify content of various types on the Internet or another network. In one embodiment, a media player device having a processor and a memory executes an automated process in which an identifier uniquely associated with a particular media program is received and processed. The identifier is submitted from the media player device to a registry service accessible via the digital network to thereby locate the particular media program for playback by the media player device, and a message containing the identifier is initiated and transmitted to a recipient media player device via the digital network to thereby allow the recipient media player device to locate the same particular media program on the digital network using the identifier.

Other embodiments provide an automated process executable by a computerized server having one or more processors, memory and input/output features (e.g., network interfaces). The automated process comprises registering a plurality of media programs in a database, wherein each of the plurality of media programs is associated with an identifier; receiving a query via a network from a client device that comprises an identifier for a particular media program; searching the database to thereby locate the particular media program associated with the identifier received in the query; and performing an action associated with the identifier and responding to the client device via the network to thereby allow the client device to direct the action with respect to the particular media program via the network.

Still other embodiments provide a data processing system comprising a database of specific media programs each associated with a unique identifier and a registry server. The registry server is configured to communicate with a plurality of client devices via a network, wherein the registry server is further configured to receive requests via the network from client devices that contain identifiers of the specific media programs, to search the database to identify the specific media programs based upon the identifiers contained in the requests received from the client devices, and to respond to the requests by providing address information to the client devices via the network to thereby allow the client devices to locate the specific media programs associated with the identifiers on the network. Further embodiments of the data processing system could comprise storage or processing systems for delivering media programs via the network and/or for taking other actions (e.g., setting DVR timers or watch reminders) with respect to specific media programs, and/or a resolution service that allows client devices to locate the registry server on the network.

Additional embodiments provide additional processes, systems and devices for identifying, locating, referencing and/or sharing video content on the Internet of similar digital network. The examples presented in this summary may be modified or augmented in any manner, and many additional examples are described below.

BRIEF DESCRIPTION OF THE DRAWING FIGURES

Figure 2:
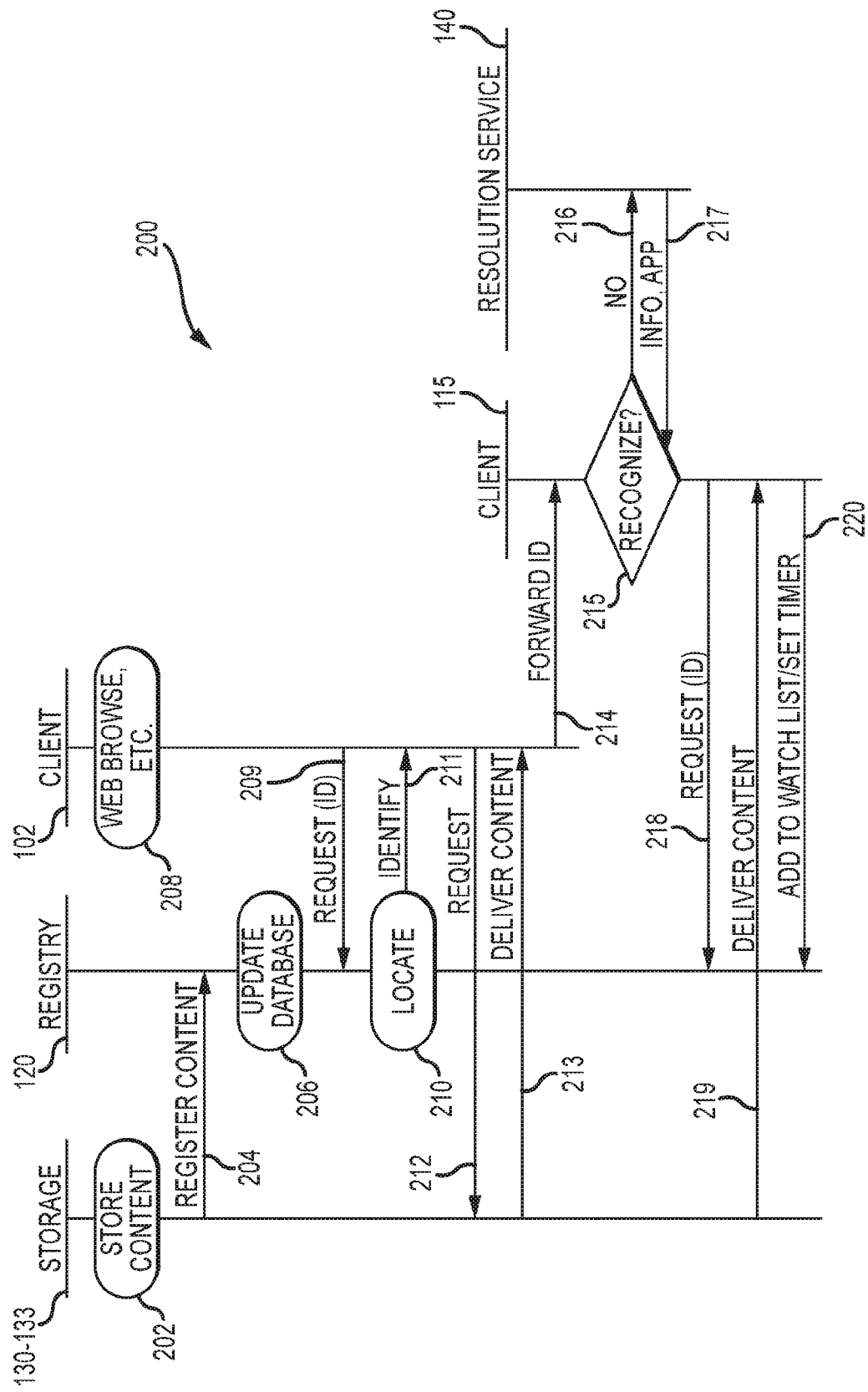

Exemplary embodiments will hereinafter be described in conjunction with the following drawing figures, wherein like numerals denote like elements, and FIG. 1 is a block diagram of an example system for identifying and sharing video content;

FIG. 2 is a diagram of an example process for identifying and sharing video content.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, media players and associated content servers use a new identifier to reference particular video programs and other media content. By using a unique text or digital identifier to reference particular programs or types of programs, users are able to share their viewing experiences with others through messaging, social media and the like. Media identifiers can enable, for example, hot linking to particular programs so that other users can share in the live viewing experience. Other embodiments could use the identifiers to add programs to a watch list, to set a DVR timer and/or to take other actions as desired.

The media player receives the identifier for a particular player in any manner; in various embodiments, the identifier for a desired program could be retrieved from a web page, an Internet search engine, a specialized web service, or from any other source. Like a uniform resource locator (URL), the identifiers can be parsed or interpreted by the media player application to identify and reference particular content on the network. Unlike a URL, however, the media identifiers may be formatted for easier sharing and referencing of media content and/or to provide additional information, as described more fully herein.

To provide just one example, a user could be viewing a program on a media player, such as a media application executing on a tablet, mobile phone or other portable device. If the user wants to suggest that friends or family to tune into the same program, the user manipulates the user interface of the application to select a "share" option. Sharing may take place via any sort of email, text messaging, platform messaging, social media application (e.g., the TWITTER or FACEBOOK services and/or the like) and/or the like. The media player application passes the unique identifier associated with the program to the recipient using the desired communications medium. A media player application executing on the recipient's device is able to interpret the unique identifier to retrieve the indicated programming, to set a recording timer for the indicated program, to add the program to a watch list, and/or to take further action as desired. In various embodiments, the identifier may be recognizable to the messaging platform and/or device operating system so that the device is able to obtain a suitable media player for viewing the identified content, if needed. Other embodiments could embed content identifiers within web pages or the like to assist media players in locating and obtaining desired content. If a user is viewing a web page associated with a program, for example, the web page may provide a link that contains the identifier for the program itself to aid the media player in immediately opening the program for viewing, in setting a DVR timer for a future broadcast, and/or in adding the program to a "watch list" for previously-aired content. If a viewer is reading about sports statistics, for example, the web page providing the statistics may include an identifier to a past, present or future broadcast of one or more games. Again, these identifiers can be shared with others via email, messaging, social media and/or the like. Many additional and alternate embodiments may be formulated, as described more fully herein.

With reference now to FIG. 1, an example system 100 to identify, reference or share video content suitably includes one or more media player devices 102 that use media identifiers 110 to reference content available via network 130 from network services 130, 131 and/or from placeshifting devices 132. Identifiers 110 may also be transmitted from device 102 to other media player clients 115 via messaging, social media and/or the like to share the media viewing experience as desired.

Media player device 102 is any specialized or general-purpose computing device capable of receiving and playing media content. Typically, device 102 is a consumer-type device that includes conventional computing hardware such as an appropriate processor 103, memory 104 and input/output interfaces 105 to support conventional computing, communication and media playback capabilities. Examples of suitable devices 102 could include, without limitation, personal computers, tablet computers, mobile telephones, video game players, personal digital assistants, home or portable media players and/or any number of other consumer-type devices.

Typically, device 102 executes one or more software applications 106 to render video for playback, to identify the video, and/or to communicate with other users. In the example shown in FIG. 1, application 106 includes a video playback window 107, a media identification window 108 and a messaging window 109. Other embodiments may include different and/or additional features, and/or may arrange the presentation of various features in any other manner.

As noted above, application 106 references particular media programs using unique media identifiers 110. Such identifiers 110 may take any format, including any sort of numeric, alphanumeric or other symbolic format. In the example illustrated in FIG. 1, media identifier 110 includes a type identifier 111, a content identifier 112, and a location identifier 113. Other embodiments may use additional or alternate components, and/or may eliminate one or more components 111, 112, 113 as desired.

Type identifier 111 specifies the application or other logic that is able to interpret the remainder of identifier 110. In various embodiments, type identifier 111 could specify a multipurpose internet mail extension (MIME) type or the like that can be registered as an Internet media type and resolved using a conventional resolution service 140. One example of a MIME resolution service is operated by the Internet Assigned Names Authority (IANA), and registration procedures are specified in Internet RFC 6838. While other embodiments could use other services or skip registration entirely, the IANA service (or equivalent registration with other respected authorities, such as device manufacturers) can be useful in that many web-enabled devices are already configured to contact the IANA service when unknown types of identifiers are encountered. Further, registration of types 111 with a published service 140 may facilitate convenient downloading and/or installation of client programs (e.g., from an app store or the like) when new content types 111 are discovered.

Program identifier 112 is a numeric, alphanumeric or other identifier that uniquely corresponds to a television program, movie or other content program. In some embodiments, the program identifier 112 may be somewhat analogous to an internet protocol (IP) or similar address found in a conventional URL, except that the identifier 112 is used to identify a particular media program and not necessarily a location on the network 130. To that end, program identifier 112 may correspond to identifiers used in electronic program guides, movie guides and/or other listings of media contents as desired.

In the example shown in FIG. 1, identifier 110 also includes a location identifier 113 that corresponds to a timestamp or other location within the indicated program.

Although identifier 113 is optional, it may be used in some implementations to facilitate "deep linking" or referencing to specific points within a broadcast or other program. If a user wants to send a link to a particular scene in a television program or a particular play in a sports broadcast, for example, the location identifier 113 may be used to indicate a specific point within the identified program content where playback should begin or end. Additional "endpoints" or other references could be added to define beginnings and ends of custom clips of the program, if desired.

Identifier 110 as shown in FIG. 1 therefore includes components 111, 112 and 113 that allow the media player 106, web browser, operating system or other component of device 102 to recognize the type of content that is referenced 111, the particular file, program or other content being referenced 112, and an optional particular location 113 within the content. Other embodiments could format identifiers 110 in any other manner, including any manner that is compatible with conventional Internet URLs, any manner that provides alternate or additional information, and/or any manner that formats information 111, 112, 113 in any other manner.

Identifiers 110 may be resolved in any manner to locate the associated programming. In various embodiments, client devices 102 communicate with one or more registry services 120 to resolve identifiers 110 in a manner somewhat analogous to conventional domain name services (DNS). To that end, registry server 120 suitably operates using conventional server-type hardware, such as conventional processor(s) 123, memory 124 and network or other input/output interfaces 125. Equivalent embodiments may be implemented using appropriate cloud-based resources, as desired. As shown in FIG. 1, registry service 120 maintains a database or other repository 126 that maps identifiers 110 to program content stored in a local database 130, a separate CDN or other network delivery service 131, and/or any placeshifting device 132 having content 133 that is accessible to client 102. Client 102 suitably submits a query to service 120 that includes the identifier 110 for the requested content. Service 120 suitably responds to the query by providing an IP or other address on network 130, by redirecting the client 102 (e.g., using hypertext transport protocol (HTTP) redirection), by delivering the identified content itself, and/or by responding in any other manner.

In various embodiments, clients 102, 115 use resolution service 140 to find registry service 120 on network 130. As noted above, registration service 140 may be known to client devices 102, 115 through operating system, application or other configuration data on the client itself. Clients 102, 115 may be able to provide identifier 110 (or a portion of identifier 110, such as type identifier 111) to resolution service 140 to locate compatible applications and/or to learn an IP or other address of a suitable registry server 120 for resolving identifiers 110 of the newly-learned type. A subsequent query 218 to registry server 120 therefore returns an IP address, URL or other information that allows the client application 196 to retrieve the desired content, or to take other actions using the identifier 110 as desired.

In various embodiments, identifiers 110 are not necessarily associated with particular copies or versions of programs stored on the network 130, but rather with the program itself. That is, the identifier 110 may identify a television program, movie or other specific program itself. Specific copies or broadcasts of the identified programs may be located by consulting an EPG, playlist or other program database, as desired. Alternatively, identified programs need not be obtained for playback in all instances. Programs could additionally or alternately be added to a playlist or watch list, for example, or a timer could be set to watch or record a later showing of the identified program.

FIG. 2 shows an example process 200 for sharing a reference to a particular program using an identifier 110. In the example process 200 shown in FIG. 2, television programs, movies and/or other media content 202 available from servers 130-133 are associated with unique identifiers 110 at registry 120. Identifiers 110 may be assigned by an EPG service, by the registry itself, and/or by any other party. In the embodiment shown in FIG. 2, servers 130-133 request identifiers 110 for stored content by placing a request 204 to registry 120. Registry 120 generates an identifier 110 and updates its registry 126 (function 206) as appropriate. Identifiers 110 may be shared with web sites, EPG services, messaging systems and/or other forms of distribution as desired.

Client devices 102 obtain identifiers 110 in any manner (function 208). In various embodiments, identifiers 110 may be incorporated as links or other structures within conventional hypertext markup language (HTML) documents, extensible markup language (XML) documents, cascading style sheets (CSS), JAVASCRIPT constructs and/or other web page components. Identifiers 110 may also be obtained via text messages, emails, social media messages and/or any other sources as desired. In these examples, the user may simply click on an icon or other feature associated with the link to reference the particular program content associated with the identifier 110. In other embodiments, identifiers 110 may be delivered to the client 102 using EPG services, video streaming services, placeshifting and/or the like.

In various embodiments, the client device 102 may use identifiers 110 to locate particular programs, or to take other actions with respect to particular programs (e.g., set recording timers, watch reminders, etc.). In this example, a user may have selected a program via an EPG or the like for viewing within a placeshifting or video streaming application. The application suitably queries the registry 120 (function 209) by providing an identifier 110 associated with an EPG entry, program name, or the like. Registry 120 searches its database 126 using the provided identifier (function 210) to locate the requested program. A URL or other address may be returned to the client device 102 (function 211) as appropriate, or other actions may be taken with respect to the requested program.

In various embodiments, client 102 is able to use the information received via message 211 to request (function 212) the associated program content from a video streaming or placeshifting service 130-133, and/or to take other actions with respect to the particular program as desired. Request 212 is shown in FIG. 2 to be sent from the client device 102 to a storage service 130-133 or other service that provides the identified content, or that takes other actions (setting DVR timers, reminders, or other features) with respect to identified content. Request 212 may include the identifier 110 for the particular program content in some implementations. The service 130-133 identifies the requested content using the information contained in the request 212, and delivers the requested content (function 213) and/or takes other actions as appropriate. Note that if a client 102 has an identifier 110 for a particular program, it is not necessary that the identifier 110 be used to obtain and view the program content itself. Identifiers 110 may be equivalently provided to a service 130-133 and/or to registry service 120 as appropriate to set a recording timer for a future broadcast, to add a program to a watch list, to forward viewing suggestions to another user, to take any other actions, and/or for any other purposes.

Identifiers 110 may be used to share a program viewing experience with other users in any manner. In the example shown in FIG. 2, a first client device 102 suitably formats a message 214 that includes an identifier 110 for a particular program that is sent to another client device 115. Typically, the media player application 106 executing on device 102 interacts with a messaging application or service (e.g., an email, platform messaging, SMS, and/or similar messaging service), a social media application (e.g., FACEBOOK, TWITTER and/or the like), or the like that is also executing on the same device 102. In various embodiments, the media player application 106 may provide a "share" icon or similar interface feature that leads to a subsequent screen that lets the user select a messaging or social media service in which to transmit the identifier 110, along with any accompanying text (e.g. "Hi friends, check out this program!"). Messages 214 may be send to one or more specified recipients, and/or may be posted to discussion forums, home pages, web pages or other sites available to larger groups (or to the public) as desired.

Subsequent users 115 encountering the identifier 110 in a web page, received message or the like can process the identifier 110 to view or otherwise interact with the identified television program. In the example of FIG. 2, the recipient 115 may already include an application (similar to application 106 executing on device 102) that is able to receive and process the identifier 110. If the recipient device 115 does not contain an appropriate application, however, or is otherwise unable to process identifier 110, then the device suitably contacts an IANA or other resolution service 140 to identify an application associated with identifier type 111 (function 216). Recipient device 115 is then able to download a suitable application, if needed. Resolution service 140 may also direct recipient device 115 toward an appropriate registry service 120, and/or may provide other information as needed to process identifiers 110 having the specified identifier type 111 (function 217).

If recipient device 115 has appropriate applications and/or other capabilities to process identifiers 110, the device 115 suitably requests content using the identifier 110, or takes other actions as appropriate (function 218). Since the identifier 110 references the same content previously processed at device 102, the user of device 115 is able to conveniently access content referenced by the user of device 102. The shared identifiers 110 therefore allow users of devices 102 and 115 to share the television viewing, placeshifting or other media streaming experience, as desired. Again, identifiers 110 may be used to obtain the same content from a placeshifting or video streaming service 130-133 (function 219), or to interact with a program guide or other service that can direct recording timers, add the program to a watch list, or take other actions as desired (function 220). Note that different client applications may be able to modify the identifier 110 in certain ways, e.g., by specifying particular points in the identified content (e.g., using location identifier 113). By specifying a particular location 113 within the identified content, the client device 102 can use the identifier 110 to support tagging, clipping, commenting, "deep linking" or other features, as desired.

Identifiers 110 therefore allow multiple devices 102, 115 operating in a networked environment to share references to television programs, movies or other content. These broad concepts may be implemented in any number of settings. A placeshifting service, for example, could use identifiers 110 registered with registry 120 to locate clips or other programming that is stored on a user's home DVR 133. Alternatively, the identifiers 110 could be used to access programs available from an RSDVR, VOD service, or the like. Content referenced by identifiers 110 could be streamed in real time, downloaded for later viewing, and/or simply referenced for later viewing or recording. Many equivalent embodiments could use similar concepts to reference any sort of programming or other media content for discussion, downloading, streaming, recording, and/or the like.

The foregoing discussion therefore considers several different systems, devices and processes/methods to identify, reference and/or share video content over a digital network. These general concepts may be expanded or modified as desired to create any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process executable by a media player device that receives media content via a digital network, the process comprising:

receiving an identifier of the media content by a first application executed by the media player device via the digital network, wherein the identifier uniquely identifies a particular media program, and wherein the identifier comprises a first portion that identifies a type of the identifier, a second portion that identifies the particular media program, and a third portion that identifies a location within the particular media program;

submitting the identifier from the first application of the media player device to a registry service accessible via the digital network to thereby locate the particular media program on the digital network and to identify a media application other than the first application that processes the particular media program based upon the identifier; and in response to a subsequent message from the registry service containing the location of the particular media program on the digital network and identifying the media application that processes the particular media program, the media player device initiating a message to the identified media application to thereby allow the identified media application to locate the same particular media program on the digital network using second and third portions of the identifier and to process the particular media program by the identified media application.

2. The automated process of claim 1 wherein the third portion of the identifier corresponds to a timestamp of the particular media program.

3. The automated process of claim 1 wherein the type of the identifier is associated with the media application that interprets the identifier and thereby locates the particular media program on the digital network.

4. The automated process of claim 3 wherein the media application directs a video recorder device to record the particular media program.

5. The automated process of claim 4 wherein the first application is a web browser executed by the media player device, wherein the identifier is embedded within a web page received by the browser application, and wherein the media application receives the identifier from the browser application to thereby locate and direct the recording of the particular media program.

6. The automated process of claim 3 wherein the media application cooperates with a messaging application so that the initiating comprises the media application passing the identifier to the messaging application to thereby generate a message to a recipient that includes the identifier associated with the particular media program.

7. The automated process of claim 3 wherein the media application cooperates with a social media application so that the initiating comprises the media application passing the identifier to the social media application to thereby generate a message to a social media platform that includes the identifier associated with the particular media program.

* * * * *